Aug. 9, 1932.   A. STERNEMANN   1,870,932
POTATO TOPS DESTROYER
Filed Oct. 22, 1929
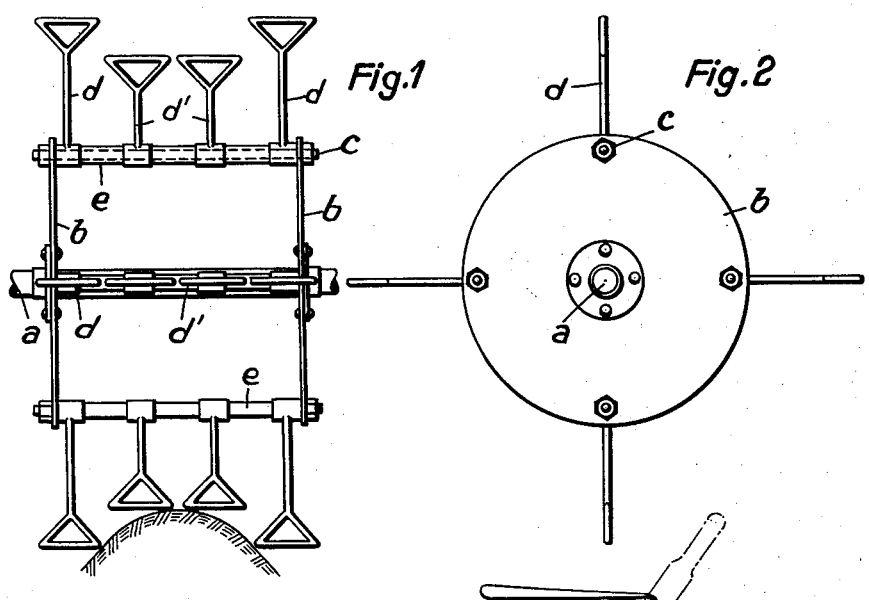
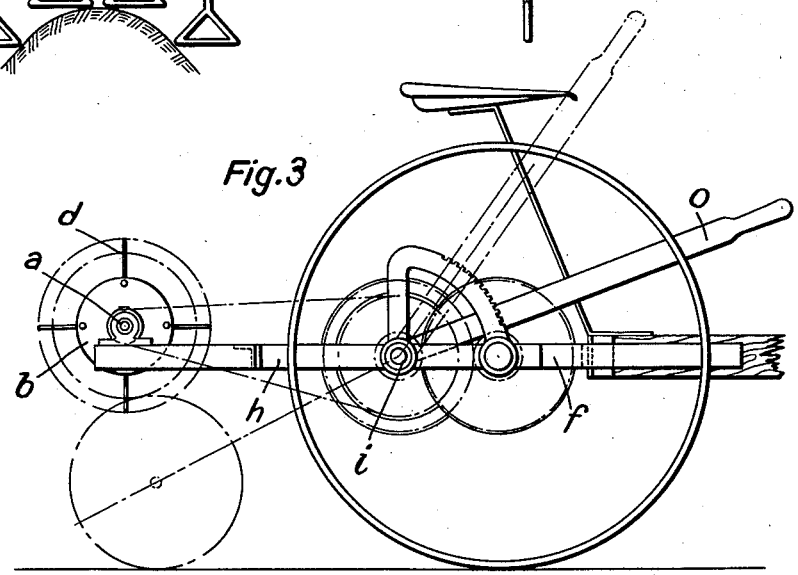
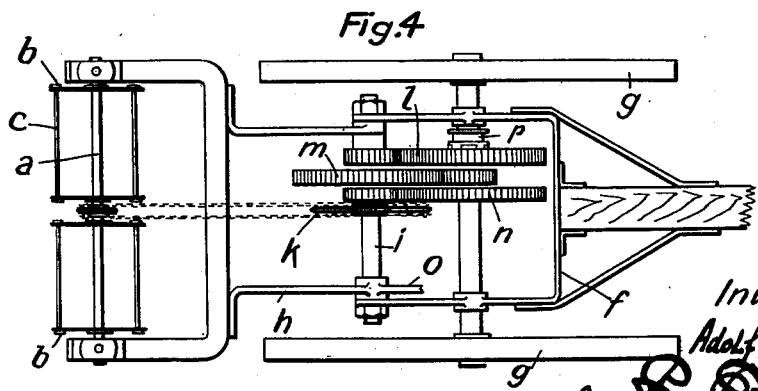
Inventor:
Adolf Sternemann
by Paul D. Schilling
attorney.

Patented Aug. 9, 1932

1,870,932

UNITED STATES PATENT OFFICE

ADOLF STERNEMANN, OF BERLIN-FRIEDENAU, GERMANY

POTATO TOPS DESTROYER

Application filed October 22, 1929, Serial No. 401,434, and in Germany October 25, 1928.

The potato harvesting machines used in agriculture, work unsatisfactorily when the potato tops, i. e. the stalks and leaves, are strongly developed, in that the harvesting machine will then be obstructed by said parts. I am aware of the existence of potato tops mowing machines, pulling-out machines, and the like, but I know also as a fact that none of them answers its purpose in a satisfying manner which is due to the undulated shape of the ground and the unfavorable position of the potato tops thereon, whereby the tools provided for the purpose in view are prevented from acting on all stalks and leaves.

The drawbacks experienced hitherto have now been overcome by the present improved machine which is capable of dashing to pieces all potato tops, without exception, so that nothing thereof can constitute and act as an impediment to the proper action of the machine. I attain this effect by the provision of beating members hinged to a rotary frame which is moved around while the machine is in operation, the beating members then swung round in parallel vertical planes extending in the direction of movement of the machine, and said members being subjected to centrifugal force whereby they are enabled to act powerfully upon the potato tops and dash them completely to pieces. The rotary frame with its beating members and the means by swinging these latter round may be designed as a self-contained device, or may be attached to, and continually connected with, a suitable potato harvesting plough, the arrangement being then such that the beating members operate in front of the blade or share of the plough.

The invention is illustrated diagrammatically and by way of example on the accompanying drawing on which Fig. 1 is a front-view of a rotary frame with beating members, Fig. 2 is a side-view thereof, Fig. 3 shows, in side-view the rotary frame with its beating members attached to a portable machine by which it is supported, as well as actuated, said frame and said beating members being drawn to a reduced scale, and Fig. 4 is a plan of the parts shown in Fig. 3.

On the drawing, *a* (Figs. 1 and 2) denotes a shaft which can be rotated by any suitable means, for instance by a cog-wheel gearing or a chain gearing, and to which are affixed two disks *b* in a distance from one another which corresponds practically to the breadth of a potato bank. The disks are at their circumference connected with one another by rods *c* to which are hinged the beating members *d* and *d'* which are separated from one another by spacing tubes *e*. The free ends of the arms *d d'* are enlarged, these enlargements constituting the beating members or tools proper, and the arms or members *d'* are by so much shorter than the arms or members *d* as corresponds to the convex shape of the potato bank (see the lowermost part of Fig. 1). Each beater includes an arm carrying at its outer end a frame in the form of an isosceles triangle, the apex of the triangle being connected to the outer end of the arm and the base of the triangle being parallel to the shaft to which it is hinged or pivoted.

When the shaft *a* is rotated rapidly enough, the beating members will assume radial positions, as in Figs. 1 and 2, and when at the same time they are moved forwards they attack the tops, that is to say, the stalks and leaves, of the potatos and dash and destroy them completely. Owing to the beating members being hinged to the rods *c* (or to equivalents of them), they can give way when encountering resistance-forming parts, such as stones, earth clods, and the like, and can pass away over such parts without causing or entailing shocks in the structure. The shaft *a* is so adjusted with respect to the ground, as regards its position of height above it, that these beating members which are the lowermost at the time being contact with the bank so that they can act upon all stalks and leaves and destroy them, as intended.

In order to reduce the resistance presented by the air when the members *d d'* are rotating, the operating ends of these latter are designed as open frames, which form triangles in the example shown in Fig. 1 but may have also any other suitable shape.

Suspending the beating members from their carriers presents also the advantage that they themselves cannot be obstructed if, perhaps, the potato tops should be very dense.

In Figs. 3 and 4 the beating device proper is combined with a machine by which it can be actuated. $f$ is a portable frame running on wheels $g$ and $h$ is a frame hinged to axle $i$ and carrying at its rear the shaft $a$ with its disks $b\ b$ and the beating members $d$. There are in this example two beating devices proper (see Fig. 4), so that two potato banks can be acted on at a time.

The axle or, more precisely, shaft $i$ is a member of a cog-wheel gearing, another member of which is a chain-wheel $k$ connected by a chain with another (smaller) chain-wheel secured to the shaft $a$. $l$, $m$ and $n$ are cog-wheels forming parts of said gearing, i. e. transmission gearing, by which the rotary motion of the axle or shaft of the wheels $g$ is transmitted to the chain-wheel $k$ etc. $r$ is a part of a coupling, by which the cog-wheel gearing can be disconnected from the axle or shaft of the wheels $g$, and $o$ is a manually operable lever by which the frame $h$ with the two beating devices can be lifted from the ground so that the beating members then can no more act upon the potato tops.

I claim:

1. A potato tops destroyer for use in harvesting of potatoes comprising in combination a shaft arranged transversely with respect to the direction of movement of the destroyer, arms hinged to said shaft in such manner as to swing in the direction of movement of the destroyer, beating members located at the free ends of said arms and each consisting of a frame of isosceles triangular shape and having its apex connected to the free end of a respective arm and having its base extending parallel to the said shaft, the beaters between the ends of the arms being shorter than those at the ends of the said shaft, means for supporting the shaft, and means for rotating it.

2. A potato tops destroyer for use in harvesting of potatoes, a rotatably mounted shaft, means for turning the shaft, beating members having a hinged connection with said shaft, the beating members being elongated transversely of the movement of the destroyer, the beating members in the central zone of the shaft being shorter than the beating members at the ends of the shaft.

3. A potato tops destroyer comprising in combination a shaft arranged transversely with respect to the direction of movement of the destroyer, members fixed to said shaft, beating members having hinged connection with said shaft, the beating members at the intermediate portion of the shaft being shorter than those at the ends of the said shaft.

In testimony whereof I have affixed my signature.

ADOLF STERNEMANN.